United States Patent [19]

McCabe

[11] 4,277,870

[45] Jul. 14, 1981

[54] METHOD FOR INSTALLING AN ANGLE BLADE DAMPER

[75] Inventor: Francis J. McCabe, Doylestown, Pa.

[73] Assignee: Prefco Products, Inc., Buckingham, Pa.

[21] Appl. No.: 74,290

[22] Filed: Sep. 11, 1979

Related U.S. Application Data

[60] Division of Ser. No. 891,330, Mar. 29, 1978, Pat. No. 4,185,657, which is a continuation-in-part of Ser. No. 764,774, Feb. 2, 1977, Pat. No. 4,114,646, which is a continuation of Ser. No. 689,994, May 26, 1976, Pat. No. 4,081,173, said Ser. No. 891,330, is a continuation-in-part of Ser. No. 770,831, Feb. 22, 1977, Pat. No. 4,113,230, and Ser. No. 729,831, Oct. 4, 1976, Pat. No. 4,113,232, each is a continuation-in-part of Ser. No. 689,994, , said Ser. No. 891,330, is a continuation-in-part of Ser. No. 874,001, Jan. 31, 1978, Pat. No. 4,165,629, which is a continuation-in-part of Ser. No. 736,823, Oct. 18, 1977, Pat. No. 4,080,860, which is a continuation-in-part of Ser. No. 650,926, Jan. 21, 1976, Pat. No. 4,004,480.

[51] Int. Cl.³ .......................... B21D 53/00; B23P 11/00

[52] U.S. Cl. .................................. 29/157 R; 29/417; 29/434

[58] Field of Search .................. 49/74, 77, 80, 90, 91, 49/92; 98/110, 121 R, 121 A; 137/601; 160/5, 381; 251/305, 306, 308; 29/155 R, 157 R, 417, 434

[56] References Cited

U.S. PATENT DOCUMENTS

| | | | |
|---|---|---|---|
| 1,368,453 | 2/1921 | Ream | 49/92 X |
| 2,759,573 | 8/1956 | Schwab | 49/92 X |
| 3,270,657 | 9/1966 | Jaye | 98/110 |
| 3,581,650 | 6/1971 | McCabe | 49/77 X |
| 3,584,566 | 6/1971 | McCabe | 98/110 |
| 3,606,245 | 9/1971 | Reichow et al. | 137/601 X |
| 3,682,084 | 8/1972 | Tarnoff | 98/110 |
| 3,793,932 | 2/1974 | Tarnoff | 98/110 |
| 3,833,989 | 9/1974 | McCabe | 29/157 R |
| 3,908,529 | 9/1975 | McCabe | 98/110 |
| 4,081,173 | 3/1978 | McCabe | 49/92 X |

*Primary Examiner*—Ervin M. Combs

*Attorney, Agent, or Firm*—Benasutti Associates, Ltd.

[57] ABSTRACT

A novel damper kit is described wherein blade stock having a hook-shaped hinge portion formed therein, and notched angle bracket stock having periodically spaced hook-shaped hinge elements formed therealong can easily be cut and assembled at the job site to custom fit and install a damper in a duct, opening, or plenum.

6 Claims, 8 Drawing Figures

Fig. 4
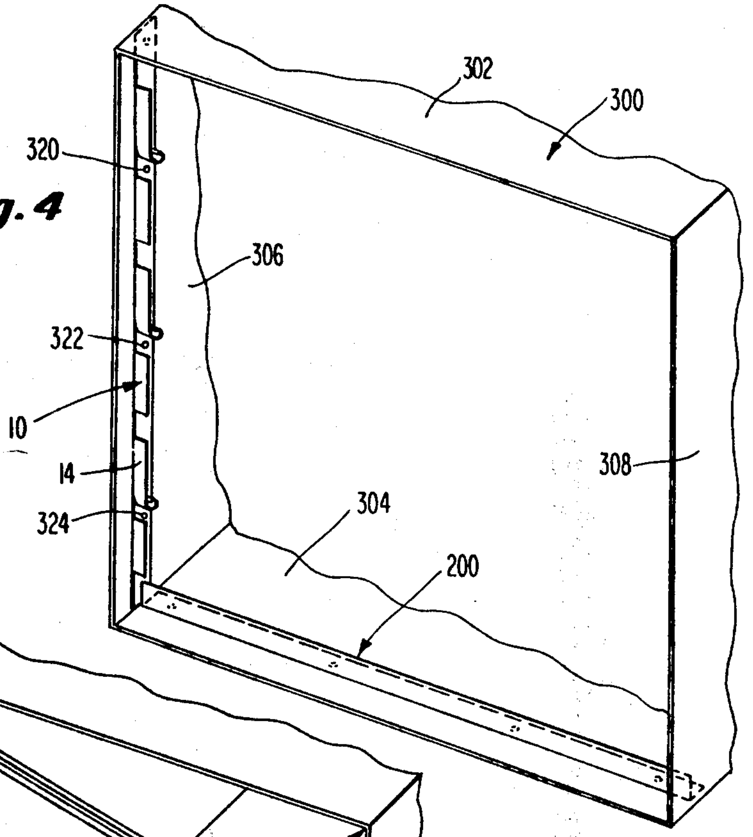
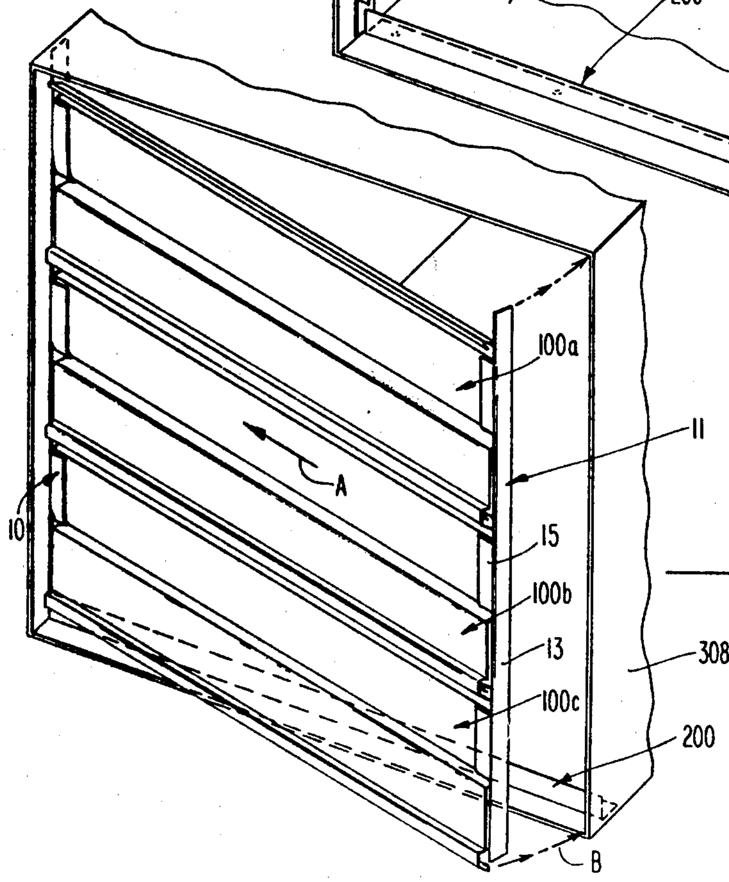
Fig. 5

METHOD FOR INSTALLING AN ANGLE BLADE DAMPER

CROSS-REFERENCE TO RELATED APPLICATIONS

This is a division of U.S. patent application Ser. No. 891,330, filed Mar. 29, 1978, now U.S. Pat. No. 4,185,657, dated Jan. 29, 1980.

U.S. patent application Ser. No. 891,330 is a continuation-in-part of my prior co-pending patent application Ser. No. 764,774, filed Feb. 2, 1977 entitled, "Rotating Blade Fire Damper," now U.S. Pat. No. 4,114,646, dated Sept. 19, 1978, which is a continuation of application Ser. No. 689,994, filed May 26, 1976 entitled, "Rotating Blade Fire Damper," now U.S. Pat. No. 4,081,173, dated Mar. 28, 1978, which applications are incorporated by reference as is fully set forth herein.

U.S. patent application Ser. No. 891,330 is also a continuation-in-part of my prior co-pending patent application Ser. No. 770,831, filed Feb. 22, 1977 entitled, "Rotating Blade Fire Damper," now U.S. Pat. No. 4,113,230, dated Sept. 12, 1978, and of U.S. patent application Ser. No. 729,831, filed Oct. 4, 1976 entitled, "Smoke, Fire and Air Control Damper With Stamped Blade Hinge," now U.S. Pat. No. 4,113,232, dated Sept. 12, 1978, which applications are continuations-in-part of my aforementioned prior co-pending patent application Ser. No. 689,994, filed May 26, 1976, now U.S. Pat. No. 4,081,173, which applications are also incorporated by reference as is fully set forth herein.

U.S. patent application Ser. No. 891,330 is also a continuation-in-part of my prior co-pending patent application Ser. No. 874,001, filed Jan. 31, 1978 entitled, "Multi-Punch, Multi-Die Assembly for Stamping Hook-Shaped Damper Hinge Members," now U.S. Pat. No. 4,165,629, dated Aug. 28, 1979, which is a continuation-in-part of my prior co-pending patent application Ser. No. 736,823, filed Oct. 18, 1977 entitled, "Press," now U.S. Pat. No. 4,080,860, dated Mar. 28, 1978, which application is a continuation-in-part of my prior co-pending patent application Ser. No. 650,926, filed Jan. 21, 1976 entitled, "Press," now U.S. Pat. No. 4,004,480, dated Jan. 25, 1978, which applications are also incorporated by reference as is fully set forth herein.

U.S. patent application Ser. No. 891,330 is also related to my concurrently filed patent application Ser. No. 891,331, filed Mar. 29, 1978 entitled, "Rotating Blade Fire Damper," now U.S. Pat. No. 4,185,658, dated Jan. 29, 1980, which application is specifically incorporated by reference as is fully set forth herein.

U.S. patent application Ser. No. 891,330 is also related to my prior issued U.S. patents including U.S. Pat. No. 3,866,657, dated Feb. 18, 1975 entitled, "Fire Damper;" U.S. Pat. No. 3,908,529, dated Sept. 30, 1975 entitled "Backdraft Damper;" U.S. Pat. No. 3,899,156, dated Aug. 12, 1975 entitled, "Single Blade Fire Damper;" and U.S. Pat. No. 3,833,989, dated Sept. 10, 1974 entitled, "Method of Fabricating and Assembling a Damper," which patents are also incorporated by reference as is fully set forth herein.

BACKGROUND OF THE INVENTION

The present invention relates generally to the field of dampers, such as backdraft, smoke, fire, or air control dampers. More particularly, the present invention relates to methods and apparatuses for installation by workmen at a given job site into a given duct, opening, or plenum.

At the present time, virtually all dampers made and installed in this country are pre-ordered in custom sizes designed to fit the particular dimensions of a duct, plenum, or opening. This custom of the trade has resulted from the fact that heretofore smoke, fire, air control and backdraft dampers have all been relatively complicated items to assemble requiring sophisticated tools and skilled workmen to accomplish their fabrication. For example, it has been necessary to utilize rivets, welding apparatuses, punch and die mechanisms and other such machines in the assembly of such units, and these machines and the skill to utilize them in constructing a particular sized damper are not readily available at a particular job site. Nonetheless, the inability of a contractor to construct and install a damper at the job site can conceivably hold up a particular construction project for a considerable length of time while an appropriate sized damper is ordered from the manufacturer to fit a given opening. Additionally, it would be particularly advantageous to provide not only contractors but also home "do-it-yourselfers" with kits which could be purchased in a building supply outlet and which could be fitted into whatever opening might arise at the job site. Heretofore, no such damper kit has been available from which dampers of varying sizes can be simply and easily made and installed in an opening at the job site utilizing only those tools available in a home workshop.

SUMMARY OF THE INVENTION

The present invention provides a novel damper kit comprising as few as two stock parts, which damper kit can easily be assembled by the home handyman, or job site contractor to fit any of a variety of sizes of generally square or rectangular openings.

The damper kit of the present invention comprises specially configured blade stock and complementally configured, periodically notched angle stock which can be cut into appropriate lengths for installation into a generally rectangular opening utilizing conventional fastening means such as, screws, nails, glue, etc. Optionally, solid, right-angle bracket stock may also be included in the kit to improve the sealing characteristics of the damper along the longitudinal edges of the endmost blades of the assembled damper. For most installations, this kit may be easily assembled into a custom damper by a single workman utilizing only a screwdriver, hand drill and saw.

Accordingly, a primary object of the present invention is the provision of a novel damper kit which is simple, low cost, and readily installable at the job site.

Another aim of the present invention is to provide a novel damper design utilizing a special angle bracket configuration which facilitates not only the hinging of the damper blade thereon, but also provides clearance to allow adjacent blades to create seals with respect to each other along their entire lengths.

Another object of the present invention is the provision of a simple method for installing a damper into an opening, duct, or plenum at the job site.

These and other objects of the present invention will become apparent from the following more detailed description of the drawings.

BRIEF DESCRIPTION OF THE DRAWINGS

FIG. 4 is a fragmentary perspective view of the end of a duct into which a damper is to be installed, showing an installed length of "left hand" notched angle stock and an installed length of solid angle-bracket mounted therein;

FIG. 5 is a view of the duct shown in FIG. 4 into which is being assembled a plurality of blades and a length of "right hand " notched angle stock;

DETAILED DESCRIPTION OF THE PREFERRED EMBODIMENT

Figure 3:
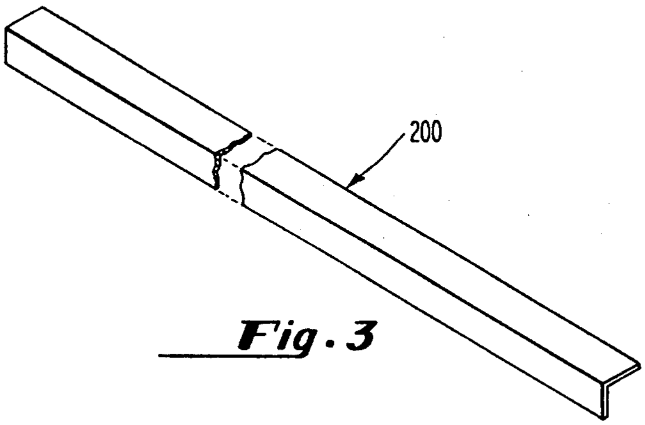
FIG. 3 is a foreshortened isometric view of a length of solid right angle-bracket in accordance with the preferred embodiment of the present invention.

Although specific forms of the invention have been selected for illustration in the drawings, and the following description is drawn in specific terms for the purpose of describing these forms of the invention, this description is not intended to limit the scope of the invention which is defined in the appended claims.

Figure 1:
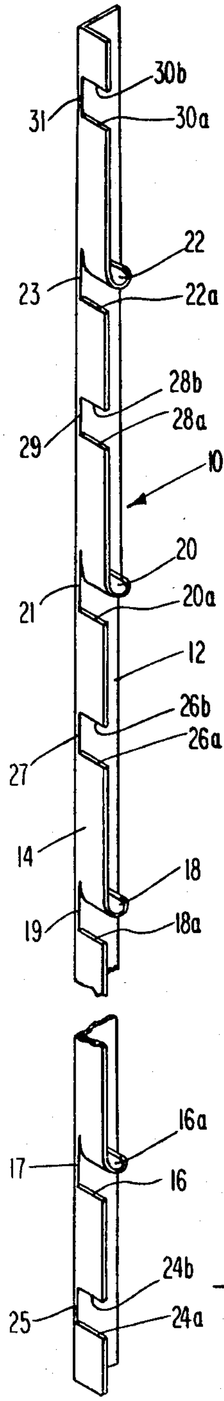
FIG. 1 is a foreshortened isometric view of a length of "left hand" notched angle stock in accordance with the present invention.

Referring now to the figures, FIG. 1 illustrates a length of notched angle stock 10 which comprises two transverse portions, a first solid transverse strip 12 which is perpendicularly oriented with respect to a second notched face strip 14. This angle stock 10 is preferably constructed from steel, such as galvanized steel, extruded aluminum, or some other material which can withstand the notching and formation of hinge elements on the face strip 14 portion thereof, as described more fully hereinafter. The notched face strip 14 of angle stock 10 has periodic hook-shaped hinge elements 16, 18, 20, and 22 formed therealong. These hinge elements may be formed utilizing the novel punch and die apparatus described in my co-pending patent application Ser. No. 874,001, filed Jan. 31, 1978 entitled, "Multi-Punch, Multi-Die Assembly For Stamping Hook-Shaped Damper Hinge Members," now U.S. Pat. No. 4,165,629, dated Aug. 28, 1979, which application is specifically incorporated by reference as if fully set forth herein.

These hook-shaped hinge elements 16, 18, 20 and 22 are spaced along the face strip 14 at spacings which are selected to cooperate with the particular blade stock size and configuration provided with the particular kit. Their creation results in the formation of hinge element notches defined between hinge elements 16, 18, 20 and 22 and adjacent hinge element notch edges 16*a*, 18*a*, 20*a*, and 22*a*. In most instances, these hook-shaped hinge elements will be spaced apart from each other along the face strip 14 by a distance equal to the width of the damper blade to be utilized therewith less about one-half of the distance of the overlap created by adjacent blades in the closed position. These hinge elements are disposed along the face strip 14 between clearance notches defined between face strip clearance notch edges 24*a* and 24*b* 26*a* and 26*b*, 28*a* and 28*b* and 30*a* and 30*b*. The clearance notches are provided to allow adjacent blades to engage each other along their entire lengths to create a seal therealong. As shown in the drawings, these notches do not extend quite entirely across the face strip 14, but rather flanged portions 25, 27, 29 and 31, which aid in defining notches 24, 26, 28 and 30 in the face strip, remain between the notch and the intersection of the face strip 14 with the transverse strip 12. Similar hinge element notch flanges 17, 19, 21 and 23 are formed adjacent the intersection of the face strip 14 with transverse strip 12 for the respective hinge element notches associated with hinge elements 16, 18, 20 and 22. Together, these flanges aid in aligning the blades in the closed position and during the rotation thereof, and further, prevent the binding of the blades against the interior surface of the transverse strip 12.

Figure 2:
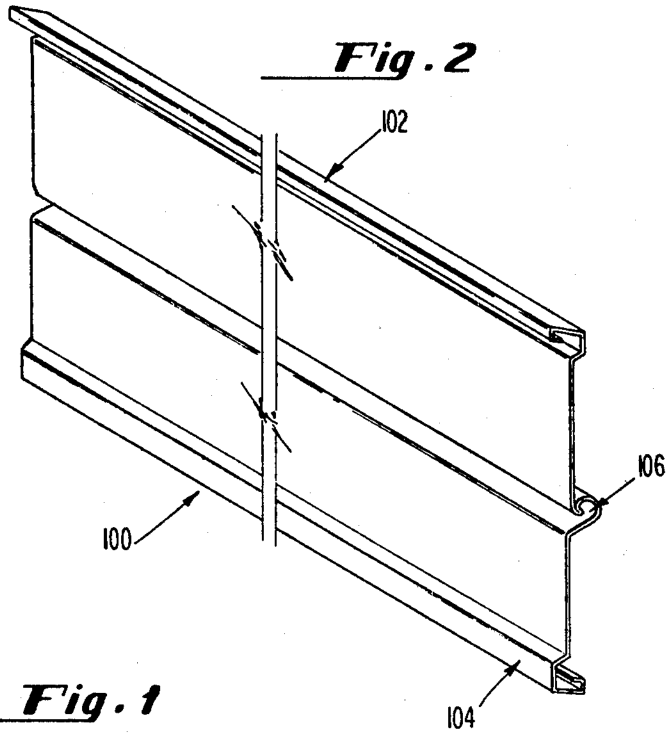
FIG. 2 is a foreshortened isometric view of a preferred embodiment damper blade made in accordance with the present invention.

Referring now to FIG. 2, a damper blade length designated generally 100 is illustrated which has hook-shaped end portions designated generally 102 and 104 formed along the longitudinal edges thereof, and which has a hook-shaped hinge portion designated generally 106 formed at approximately the longitudinal center thereof. The details of this damper blade configuration are described more fully in my prior co-pending patent application Ser. No. 764,774, filed Feb. 2, 1977 entitled, "Rotating Blade Fire Damper," which application is incorporated herein by reference. For purposes of the present invention, at least one length of damper blade 100 should be supplied with the damper kit in a length sufficient to be cut into the required number of blades to create a damper to fill the desired opening.

The notched angle stock 10 shown in FIG. 1 has, for purposes of convenience throughout this application, been referred to as a "left hand" notch angle stock. This terminology is derived from the fact that when the face strip 14 of the angle stock 10 is viewed in such a way that the hinge elements 16, 18, 20, and 22 are bent away from and hook to terminate generally upwardly as viewed from the observation point of the observer the transverse strip 12 is joined to the face strip 14 along its "left hand" edge. By the same token, the "right hand" angle strip 11 shown in FIG. 5 is identical to the "left hand" angle strip 10 with the exception that the transverse strip 13 joins the face strip 15 along its relative "right hand" edge.

It is in accordance with the teaching of the present invention to provide a single angle stock which may be used as both the "left hand" and "right hand" angle stocks. One embodiment of such a "left hand - right hand" angle stock may be produced by taking an additional portion of the face strip 14 material and notching and bending it into additional hinge elements which will be appropriately configured for use on the other side of the damper. This notching may be envisioned by referring to FIG. 1 which shows a "left hand" angle stock 10. If, for example, a portion of the face strip 14 adjacent the face strip edge 16*a* were bent into a hook extending on the same side of the face strip 14 as hinge element 16 but unlike straight hinge element 16 were bent in a generally clockwise direction and terminated downwardly as viewed in FIG. 1, then by inverting the notched angle stock the new hinge element formed to include edge 16*a* would be seen to satisfy the definition of a "right hand" hinge element, as referred to above. Of course, if hook-shaped end portions were utilized on the blades of this damper, appropriate modifiations to the size and positioning of the clearance notches would be necessary to insure that appropriate clearances were provided for the particular size angle stock being utilized.

Figure 7:
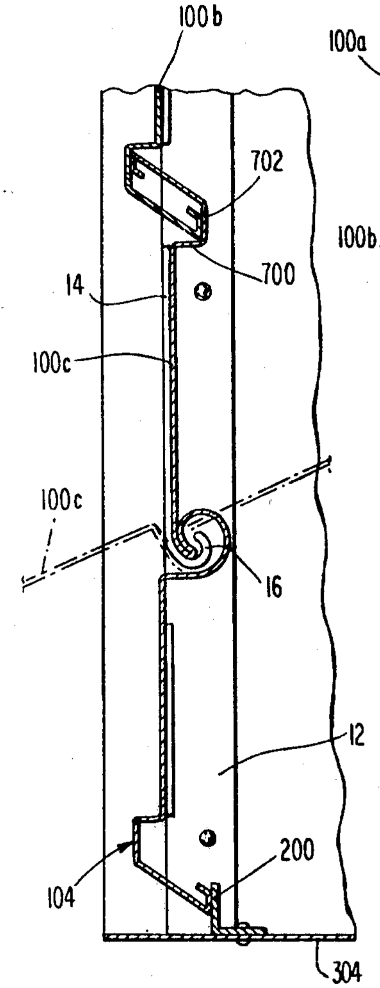
FIG. 7 is a greatly enlarged fragmentary cross-sectional view of a portion of the damper and duct illustrated in FIG. 6 taken as illustrated by the lines and arrows 7—7 in FIG. 6.

A further alternative in order to produce a "right hand - left hand" angle stock is the formation of hook-shaped hinge elements disposed generally adjacent to what is now referred to in FIG. 1 as the clearance notches 24, 26, 28 and 30. Accordingly, for example, a "right hand - left hand" notched angle stock may be produced by utilizing a portion of the face strip 14 adjacent, for example, the edge 26*a* and bending that material into a hook which generally opposes hinge element 18 and terminates, with regard to the orientation of FIG. 1, in a generally downward direction. Referring, now, in particular to FIG. 7, in order to provide clearance for such an additional hook-shaped hinge element with the blade when that hinge element is not in use the blade face 100*c* must be shortened an offsetting portion 700 and a transverse portion 702 of that blade must be appropriately lengthened in order to insure that sufficient clearance is provided for the additional hook-shaped hinge element.

Referring now to FIG. 3, the preferred embodiment damper kit of the present invention may also comprise a solid, 90° angle-bracket designated generally 200. If preferred, this solid 90° angle bracket may be predrilled or otherwise modified from that shown in FIG. 3 to receive screws, nails, or other fastening means. While this solid angle bracket is illustrated for use in the preferred embodiment, it is anticipated that, depending upon the type of installation desired, an additional length of the notched angle bracket 10 can be substituted in place of the solid angle bracket 200 in most installations, as described hereinafter.

Referring now to FIG. 4, the end portion of a duct designated generally 300 is illustrated to show the first steps in assembling the preferred embodiment damper therein. The duct is seen to have a top wall 302, bottom wall 304, left hand side wall 306 and right hand side wall 308. While the duct 300 has been selected for purposes of illustration, it is merely representative of any substantially straight sided opening into which a damper is to be installed. As shown in FIG. 4, a length of the left hand configured notch strip, designated generally 10 has been cut or severed from the remainder of the relatively longer strip illustrated in FIG. 1. In one alternate embodiment of the present invention, the transverse strip 12 of the notched angle stock 10 is grooved or creased to weaken it along lines which are aligned with respect to the top and/or bottom edges of the notches 24*a* and 24*b*, 26*a* and 26*b*, 28*a* and 28*b*, and 30*a* and 30*b* in the notched strip. These score lines, creases or weakened portions of the transverse strip enable the notched angle stock to be broken by hand so that the notched strip, prior to installation, may simply be broken to the longest length which will conveniently fit within the appropriate axis of the duct to which the notched angle stock is to be mounted. The duct shown in FIG. 4 has a vertical dimension ideally suited for use with the particular blade widths illustrated in the figures, and provided the particular end does not require the damper to be oriented in a plane exactly perpendicular to the axis of the duct, the damper kit of the present invention may be installed within a plane which is somewhat inclined with respect to the axis of the duct, so that an optimum fit may more or less be obtained for a range of opening sizes. Of course, in order to insure blade-duct clearance for the end-most blades, each of the ends of the damper should be shifted so that the end most blade sections will, upon rotation, tend to pull away from their adjacent walls. By inclining the notched angle stock, and thus the damper, extra cutting of the blades and/or special cutting of the notched angle stock may be eliminated.

As shown in FIG. 4, the length of notched angle bracket 10 is attached to duct side wall 306 by suitable fastening means 320, 322 and 324. Preferably, at this point in the assembly process, a solid angle bracket 200 is also fastened by suitable fastening means to one of the duct walls perpendicular to the wall on which the notched angle bracket has been mounted. The face of the angle bracket which is parallel to the face strip 14 of angle stock 10 is offset from the plane of the face strip 14 by a distance equal to the offset between the tip of the blade and that portion of the blade which, in the closed position, creates a seal with respect to face strip 14. Only one solid angle bracket should preferably be installed at this point, that being the angle bracket which should be offset in a direction generally behind the plane of the face strip 14 relative to the position of the worker installing the duct.

Figure 6:
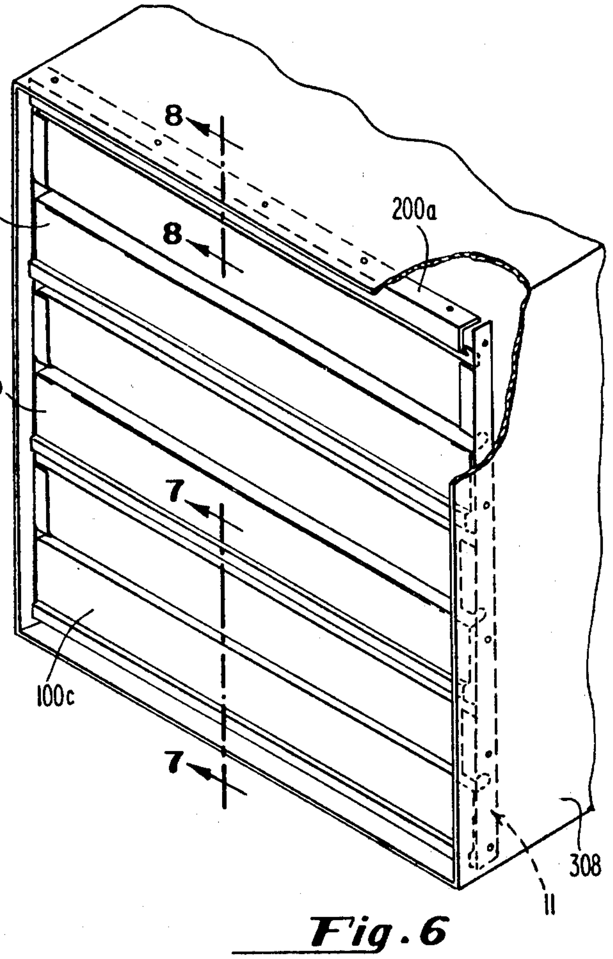
FIG. 6 is an isometric view of the completed damper, built in accordance with the assembly steps illustrated in FIGS. 4 and 5, a corner of the duct into which that damper has been assembled being broken away for purposes of illustration.

After the installation shown in FIG. 4 is completed, the blade assembly step illustrated in FIG. 5 is conducted. A plurality of blade stock lengths 100*a*, 100*b*, and 100*c* are cut from the blade stock length 100 shown in FIG. 2. These blade stock lengths are slightly undersized with respect to the distance between side walls 306 and 308. This undersizing provides enough clearance for the two solid transverse strip portions of the left and right notched angle stock lengths, for the notch and clearance flanges which are present in the notched strip portions of the notched angle stock lengths, and an additional clearance which prevents the blades from binding and which additionally facilitates their insertion, as described more fully hereinafter. In any event, the additional blade clearance which is provided by shortening the blades should be maintained less than the width of the narrowest face strip of either of the angle stock lengths. As shown in FIG. 5, the hook-shaped hinge portions of each of blades 100*a*, 100*b*, and 100*c* are inserted in the direction of arrow A in FIG. 5 into the appropriate hook-shaped hinge elements of the notched angle stock 10. An appropriate length of "right hand" angle bracket, designated generally 11, is then fitted in a similar manner over the exposed ends of blades 100*a*, 100*b*, and 100*c*. In FIG. 5, the "right hand" notched angle bracket is configui ed with a solid transverse strip portion 13 which extends away from the notched portion 15 in the same direction that the solid transverse strip portion 12 of the "right hand" notched angle bracket 10 extends away from the notched strip portion 14 of that "left hand" notched angle bracket. This configuration of the angle stock, while increasing slightly the difficulty in access to the solid transverse strip portion 13 to attach it to side wall 308, nonetheless presents a neater finish appearance to the final damper product, as shown in FIG. 6. Alternatively, if this appearance is not desired, the solid transverse strip portion 13 of notched angle bracket 11 may extend away from the notched strip portion 15 so that the solid transverse strip portion 13 will tend to protrude out away from the face of the blades in the installed position, thereby facilitating easier access and fastening of that portion to the duct side wall 308.

Although not shown in the drawings, many dampers including some backdraft dampers and most rotating dampers are used with some type of damper blade linkage which insures that all of the blades in the damper will rotate together. Although not shown in the drawings, if such a damper blade linkage is desired, it may preferably be added to each of the blade lengths 100*a*, 100*b*, and 100*c* prior to their assembly with the notched angle brackets 10 and 11 as shown in FIG. 5.

Figure 8:
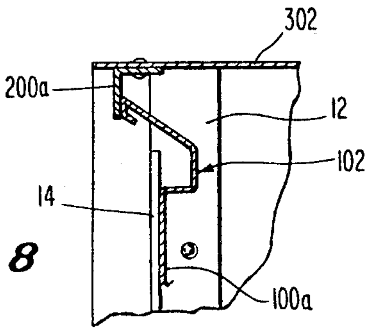
FIG. 8 is a greatly enlarged framentary cross-sectional view of a portion of the damper and duct illustrated in FIG. 6 taken as indicated by the lines and arrows 8—8 in FIG. 6.

Once the blades and angle brackets are assembled as shown in FIG. 5 along a plane which is acute with respect to the plane of orientation of the completed damper, notched angle bracket 11 and blades 100*a*, 100*b*, and 100*c* should be rotated around notched angle bracket 10 as shown in arrow B. During this rotation, notched angle bracket 11 and blades 100*a*, 100*b*, and 100*c* are compressed against the notched angle bracket 10 in order to provide sufficient clearance to move the notched angle bracket 11 into the position shown in FIG. 6, whereupon the blades and this bracket may be relatively expanded away from notched angle bracket 10 so that notched angle bracket 11 will engage the right hand duct wall and so that sufficient operating clearance will be established to facilitate easy rotation of the blades. Once in the position shown in FIG. 6, the notched angle bracket 11 is fastened to the right hand duct wall 308 by suitable fastening means and a second solid angle bracket 200*a* is applied across the longitudinal edge of the remaining endmost blade so that a seal is created therebetween when the blades are in the closed position. The orientation of this solid angle bracket 200*a* with respect to top duct wall 302 is shown in greater detail in FIG. 8. The hook-shaped end portion designated generally 102 of blade 100*a* creates a seal with the interior face of that portion of the solid angle bracket 200*a* which is perpendicular to top duct wall 302. Once again, this portion of the angle bracket is disposed in a plane which is offset from the plane of the notched strip portion 14 by a distance which is equal to the offset between the tip of the blade and that portion of the blade 100*a* which creates a seal with respect to notched strip 14; this offset is shown in FIG. 8.

Depending upon the size of the duct to be serviced, it is anticipated that, occasionally, some or all of the hook-shaped portions 102 or 104 of the endmost blades may be cut off in order to properly dimension the damper to the opening to be serviced. In such an event, the portions of the solid angle bracket 14 which are parallel to the face strip portions of the angle stock lengths will be appropriately readjusted so that seals are created along the longitudinal edges of the endmost damper blades when those blades are in the closed position. As mentioned above, lengths of notched angle stock may be used in place of solid angle brackets to create seals along the longitudinal edges of the endmost blades. In this instance, however, care must be taken to insure that the face strip portion of the notched angle stock is attached to the duct wall in an orientation which will neither interfere with the creation of a seal between the tip of the endmost blade with which it is associated and the solid transverse portion 12 of that angle bracket or with the rotation of the blade. Accordingly, in most installations, an orientation similar to that shown for angle bracket 200 in FIG. 7 would be necessary, with the notched face strip portion of the notched angle stock being the portion attached to bottom wall 304.

Referring now in particular to FIGS. 6 and 7, the neat exterior appearance of the preferred embodiment damper of the present invention is illustrated, while in FIG. 7, the rotation of blade 100*c* to an open position is shown in phantom.

It is apparent from the above description that the economy, angle-blade damper kit of the present invention provides an extremely simple damper kit, wherein as few as two different parts may be utilized to assemble the fully operative damper, as for example, a rotating blade or backdraft damper. Additionally, it will be evident from the above description, that a novel assembly method is provided wherein simple tools, such as a hacksaw, hand drill, and screwdriver may be utilized in order to completely install a damper in a duct, opening, or plenum. Finally, the fully completed damper constructed from the damper kit of the present invention in accordance with the method described herein is of unusually high quality having superior sealing and air control characteristics.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A method of installing a damper in an opening comprising the steps of:

(a) providing a length of blade stock having disposed along a longitudinal axis thereof a uniform hook-shaped hinge portion;

(b) providing notched angle stock lengths having periodically spaced therealong hook-shaped hinge elements for receiving and, upon rotation of the blade around a longitudinal axis, for slidingly engaging said blade, at least at opposite ends of said blade;

(c) installing a length of said angle stock against at least one interior surface of said opening;

(d) inserting along a transverse axis with respect to the axis of one of said hinge elements of said installed length of said angle stock at least one end of a length of said blade stock into engagement with said hook-shaped hinge element;

(e) applying a second length of angle stock on the exposed end of said blade such that a portion of the hinge portion of said blade engages at least one hook-shaped hinge element of said second length of angle stock;

(f) pivoting said second angle stock length and said at least one blade generally around said installed angle stock length into a position within said opening wherein opposing hook-shaped hinge elements and said hinge portion of said blade are coaxially oriented; and (g) attaching said second angle stock length to the opposing interior surface of said opening, to thereby create a damper within said opening.

2. The invention of claim 1 wherein said blade stock lengths are cut to lengths smaller than the interior clearance required between said angle brackets when said angle brackets are installed within said opening to thereby provide an operating clearance during said installation between said blades and said angle stock lengths.

3. The invention of claim 2 wherein, during the insertion of said at least one blade and said second angle stock, said at least one blade and said angle stock are compressed towards said installed angle stock length during at least a portion of the rotation thereof into position.

4. The invention of claim 1 wherein said method further comprises the application of sealing members opposing interior surfaces of said opening to create seals with the longitudinal edges of the endmost of said at least one blade when said blade is in the closed position.

5. The invention of claim 4 wherein said notched angle stock lengths are disposed within said opening along a plane which is transverse with respect to the central axis of said opening.

6. The invention of claim 5 wherein said plane is disposed at an acute angle with respect to said axis.

* * * * *